Patented Sept. 14, 1948

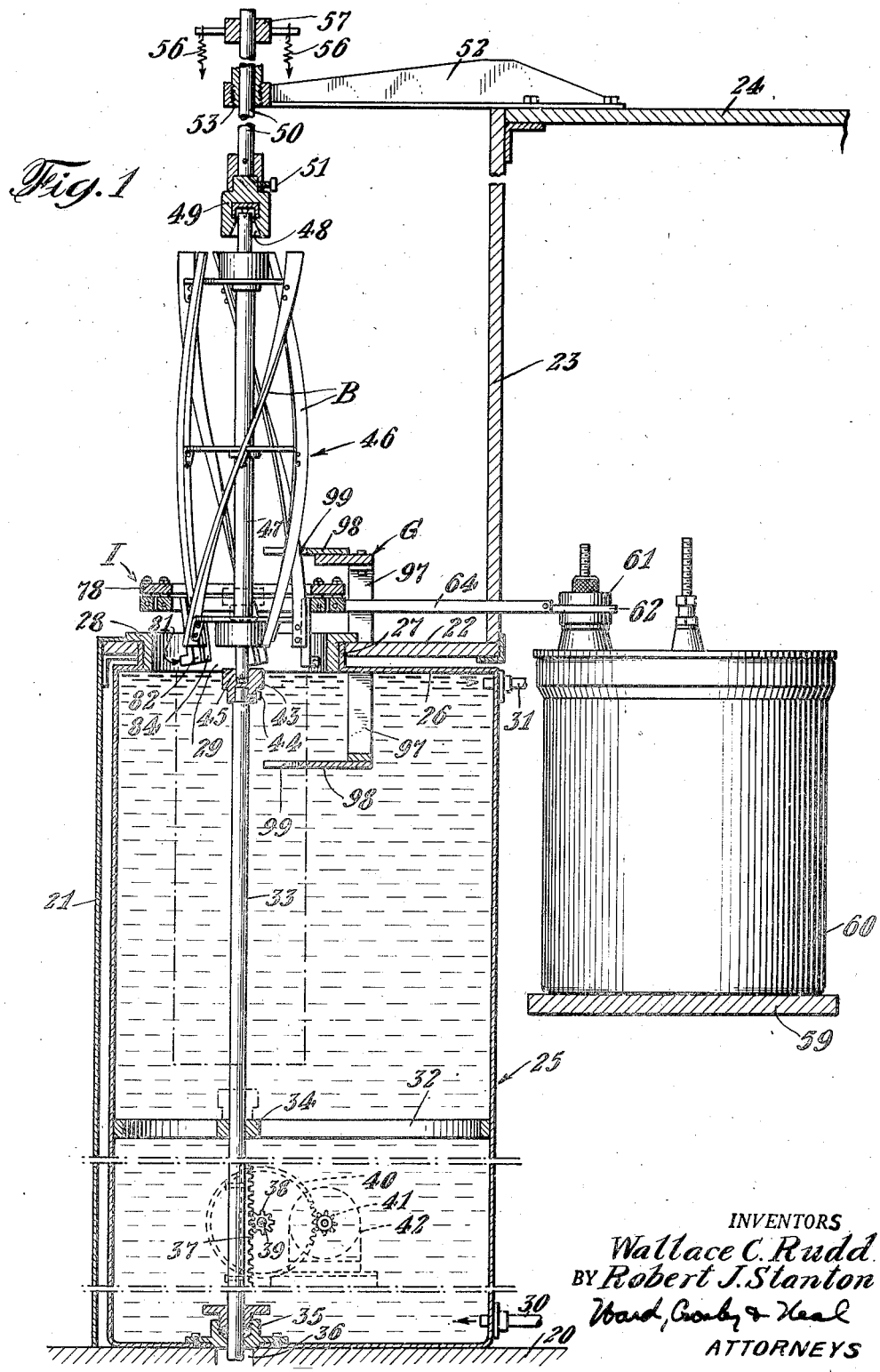

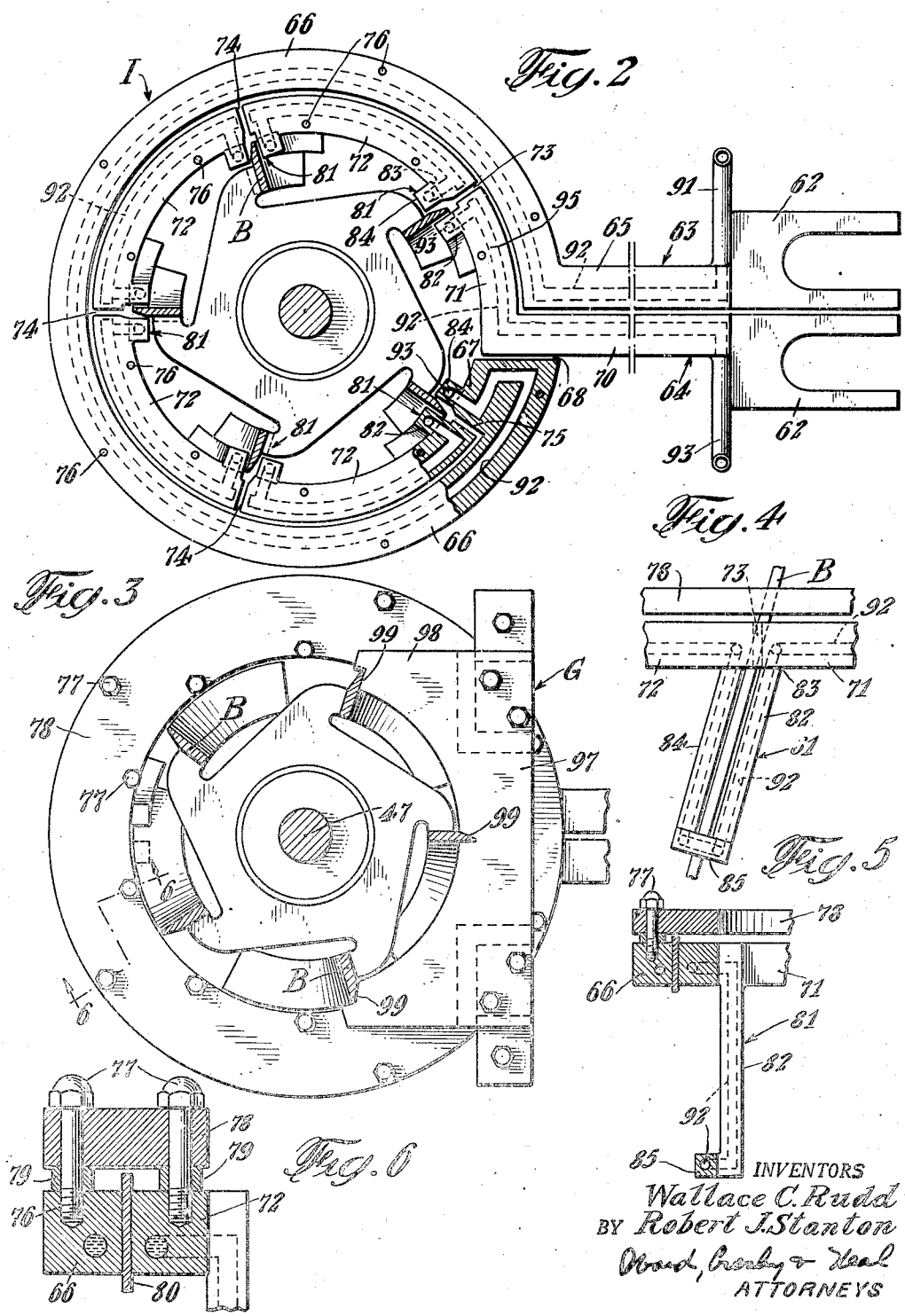

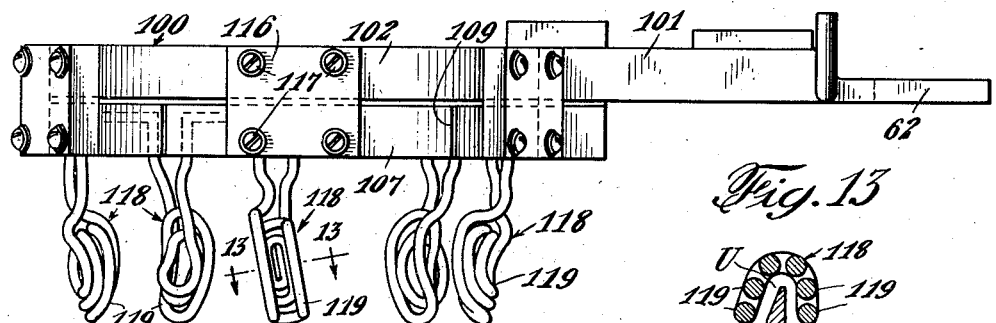
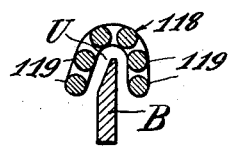
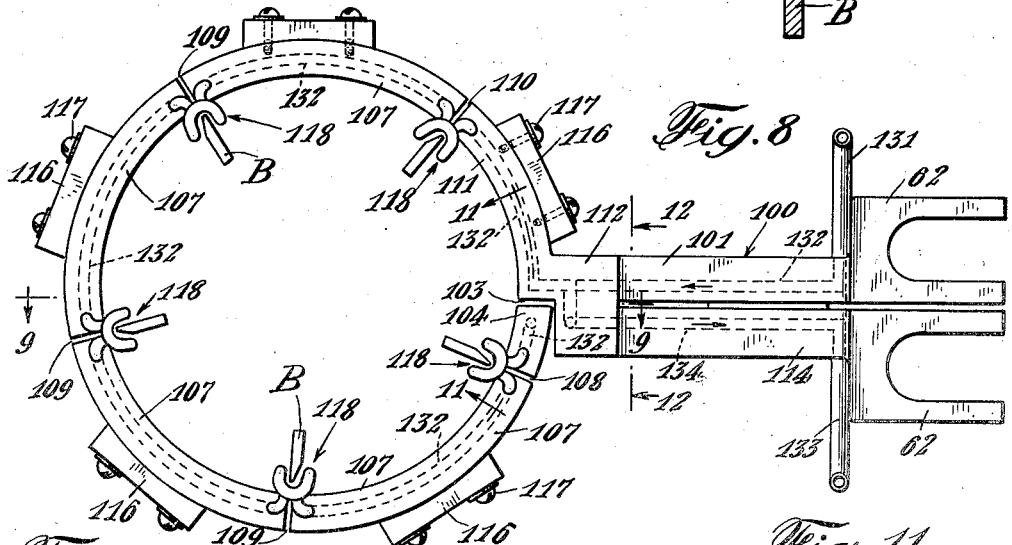
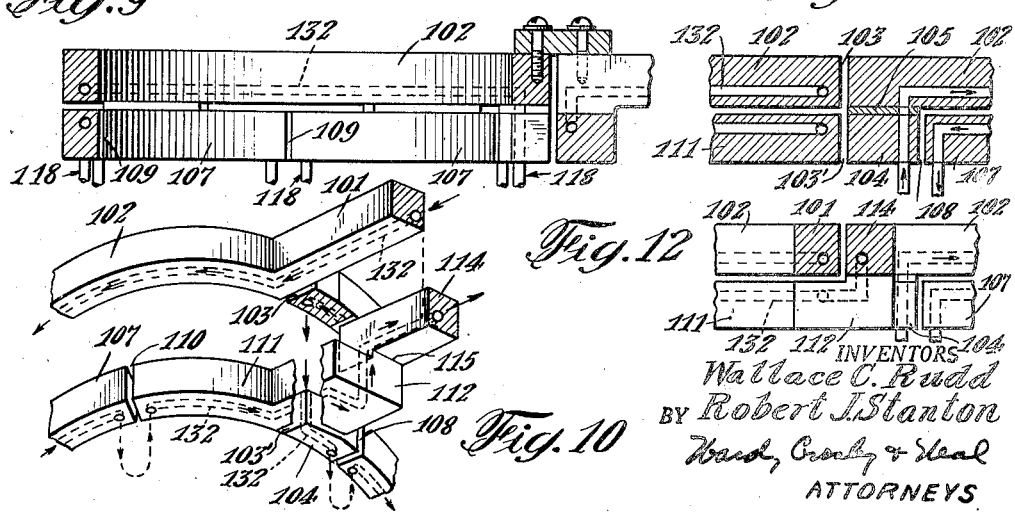

2,449,325

UNITED STATES PATENT OFFICE 2,449,325

INDUCTION HEATING OF ROTATABLE BLADE ASSEMBLIES AND THE LIKE

Wallace C. Rudd, Larchmont, and Robert J. Stanton, Brooklyn, N. Y., assignors to Induction Heating Corporation, New York, N. Y., a corporation of New York Application June 20, 1945, Serial No. 600,544

4 Claims. (Cl. 219—13)

This invention relates to induction heating apparatus and to an inductor for applying a high frequency electromagnetic field to selected surfaces of an object to thereby inductively heat such surfaces.

For the efficient use of induction heating apparatus in manufacturing operations, it is oftentimes desirable to concurrently heat several surfaces of an object, which surfaces may be of spiral, helical or other irregular shape. Many of the problems in induction heating are such as to require an accurately predetermined and uniform amount of heating of all of such surfaces. In the heat treatment of lawn mower blades, for example, it is desirable from the standpoints of economy and uniformity that all the blades of a lawn mower blade assembly be concurrently and evenly heated to a suitable tempering or hardening temperature. This may be conveniently and efficaciously accomplished according to the present invention, by providing a stationary inductor constructed and arranged to establish a plurality of localized electromagnetic fields or heating zones in response to passage of high frequency current therethrough, the work piece being moved through or adjacent the inductor in such fashion that the surfaces to be heated traverse the respective heating zones.

Each surface, as it traverses a heating zone, is in closely spaced inductive relationship with respect to an inductor element extending along one side thereof and then reversing and extending back along the other side. The reversing portions are, of course, constructed so as not to interfere with the movement of the object past or through the inductor.

When surfaces of spiral, helical or other irregular shape are heated, they should be accurately guided through the respective heating zones of the stationary inductor in order to obtain the requisite uniformity of heating. According to one aspect of the invention, this may be accomplished by rotatably mounting the object upon a suitable fixture which is movable longitudinally so as to pass the object through or adjacent the inductor. A guide may be provided to rotate the object with respect to the supporting fixture during the motion of the object through or adjacent the stationary inductor to thereby direct the helical surfaces through the respective heating zones. A second guide may be provided to engage said helical surfaces after they have moved through the respective heating zones and beyond the first guide whereby the surfaces of the object are maintained at all times within their respective heating zones. If desired, the heated surfaces may be chilled after they have passed through the respective heating zones by passing said heated surfaces into a reservoir of oil or other quenching medium.

Various other objects, features and advantages of the invention will clearly appear from the detailed description given below taken in connection with the accompanying drawings forming a part of the specification and illustrating, by way of example, preferred forms of apparatus which may be used in carrying out the invention. The invention resides in such novel features, arrangements, and combinations of parts as may be shown and described in connection with the apparatus herein disclosed.

In the drawings,

Fig. 1 is a vertical sectional view, partially in elevation, showing the novel induction heating apparatus of the invention with a lawn mower blade assembly mounted thereon;

Fig. 2 is an enlarged plan view, partially in section, of the inductor shown in Fig. 1 with the lawn mower blades in position to be heated thereby;

Fig. 3 is an enlarged plan view of the guide and support for the inductor shown in Fig. 1;

Fig. 4 is an enlarged front elevational view of one of the inductor elements with a lawn mower blade in position to be heated thereby;

Fig. 5 is an enlarged side elevational view of the inductor element shown in Fig. 4.

Fig. 6 is a sectional view taken substantially along the line 6—6 of Fig. 3;

Figs. 7 and 8 are, respectively, enlarged front elevational and inverted plan views of a modified form of an inductor for use with the apparatus of Fig. 1;

Fig. 9 is a sectional view taken substantially along the line 9—9 of Fig. 8;

Fig. 10 is a fragmentary view of a supporting portion of the inductor shown in Figs. 7 and 8 with the parts in disassembled relation;

Figs. 11 and 12 are, respectively, sectional views taken substantially along the lines 11—11 and 12—12 of Fig. 8; and Fig. 13 is a sectional view of an inductor element taken substantially along the line 13—13 of Fig. 7 with a lawn mower blade in position to be heated thereby.

Referring to the drawings in detail and particularly to Fig. 1, the supporting structure and housing for the apparatus may comprise a base 20 upon which a sidewall 21 is mounted. Sidewall 21 may support one side of a table 22, the other side of which may be secured to an upwardly-extending wall 23 mounted on a horizontal support 24 which may be rigidly secured to the base 20 in any suitable manner, not shown.

A cylindrical container or reservoir 25 may be mounted upon base 20 with the top portion 26 thereof disposed beneath the table 22. The top portion of container 25 may have a flanged opening as at 27, the flange extending upwardly through a suitable opening provided in the table 22. A cap 28, preferably formed from insulating material, is mounted over the flanged opening 27, the interior of cap 28 defining a circular passage 29 of sufficient size to accommodate the object to be heated together with the inductor elements to be hereinafter described. Container 25 may also be provided with a suitable inlet as at 30 and a suitable outlet as at 31.

A spider 32 may be disposed interiorly of container 25, a rod 33 extending vertically through a suitable bearing 34 in spider 32. The lower portion of rod 33 may extend through a stuffing box 35 at the bottom of container 25 and into a suitable recess 36 provided in the base 20. The lower portion of rod 33 carries a rack 37 in mesh with a gear 38 upon a shaft 39. Shaft 39 passes out of container 25 through a suitable stuffing box, not shown, and has a gear 40 mounted thereon outside container 25, gear 40 meshing with a pinion 41 which is suitably driven, for example, as by a motor 42.

The upper portion of rod 33 has a fixture 43 of insulating material secured thereto as by a set screw 44. A recessed upper portion 45 of fixture 43 is adapted to support an object to be heated. In the example shown, the object to be heated is a lawn mower blade assembly 46, the central shaft 47 of which is supported upon a pivot within the recess 45. The upper portion of the central shaft 47 engages a pivot within a recess 48 in a fixture 49 formed from insulating material and secured on a shaft 50 by a set screw 51. Shaft 50 is supported and held in vertical alignment with shaft 33 by a bracket 52 mounted on horizontal support 24 and provided with a suitable bearing 53. A second bracket, not shown, may be provided to support the upper part of shaft 50 in a suitable bearing, not shown. If desired, shaft 50 may be urged downwardly by springs as at 56 which are attached at their upper ends to a member 57 rigidly secured to shaft 50. The lower ends of these springs may be connected to any suitable frame part, not shown. The lawn mower blade assembly 46 together with shafts 33 and 50 are movable vertically as a unit in response to operation of the motor 42 while the lawn mower blade assembly 46 is freely rotatable with respect to shafts 33 and 50 upon the pivots in the respective fixtures 43 and 49.

A base 59, which may be supported in any suitable manner, carries a high frequency transformer 60 having secondary terminals 61 to which an inductor I is attached by lugs 62, Figs. 1 and 2. The inductor I comprises closely spaced copper bars or conductors, generally indicated at 63 and 64, which are attached, respectively, to the lugs 62. Conductor 63 comprises a straight portion as at 65 together with a substantially circular portion 66 extending around from the straight portion 65 to a position adjacent conductor 64, at which position an inner segmental portion 67 is secured to or made integral with the circular portion 66. The end surfaces of circular conductor portion 66 and segmental conductor portion 67 are closely spaced with respect to conductor 64 to thereby define a narrow gap 68.

Conductor 64 comprises a straight portion as at 70 parallel to and extending somewhat beyond the end of the straight conductor portion 65. Conductor 64 also comprises an arcuate segmental portion or conductor segment 71 disposed inwardly of the circular conductor portion 66, conductor segment 71 being closely spaced and concentric with respect to circular conductor portion 66. A plurality of arcuate conductor segments 72 are disposed in end to end relation within the circular portion 66. The conductor segment 72 adjacent conductor segment 71 is separated therefrom as by an air gap 73. In similar fashion, air gaps as at 74 separate the facing end surfaces of adjacent conductor segments 72. The conductor segment 72 adjacent the segmental conductor portion 67 is separated therefrom as by an air gap 75.

The circular conductor portion 66 and the conductor segments 71 and 72 may be tapped as at 76 to receive screws 77, Fig. 6, which extend through a substantially annular insulating member 78. The circular conductor portion 66 and conductor segments 71, 72 may be suitably spaced from insulating member 78 as by washers 79. Thus, it will be apparent that the circular conductor portion 66 and conductor segments 71 and 72 are disposed in substantially the same plane and form a rigid unitary structure with the insulating member 78. If desired, a strip of mica or other insulating material, as indicated at 80, Fig. 6, may be placed between the circular conductor portion 66 and the conductor segments 71, 72 to accurately maintain the desired close spacing thereof.

An inductor element, generally indicated at 81, Fig. 4, is connected between conductor segment 71 and the adjacent conductor segment 72 at the air gap 73. Inductor element 81 may comprise a copper bar or other conducting member 82 which may be brazed or otherwise suitably secured to the inner surface of conductor segment 71 as at 83 so as to extend angularly from the conductor segment 71. The angle of inclination of conductor member 82 with respect to the vertical is substantially identical with the angle of inclination of the lawn mower blade B with respect to the central shaft 47, Fig. 1. A return conductor member 84, Fig. 4, is brazed or otherwise suitably secured to the inner surface of conductor segment 72 so as to extend downwardly therefrom in parallel relation with conductor member 82, the spacing between conductor member 82 and conductor member 84 being sufficient to allow the lawn mower blade B to pass therebetween. The lower portions of conductor member 84 and conductor member 82 are connected by a conducting member 85 which is positioned so as not to interfere with the movement of the blade B longitudinally of the inductor element 81.

An inductor element 81 is connected between adjacent conductor segments 72, Fig. 2, at each of the air gaps 74 and there is an inductor element 81 connected between the segmental conductor portion 67 and the adjacent conductor segment 72 at the air gap 75. Consequently, current supplied by the secondary terminals of the transformer 60 may pass through one of the lugs 62, straight conductor portion 65, circular conductor portion 66, segmental portion 67 and thence through the conductor member 84, conductor 85 and conductor member 82 into the adjacent conductor segment 72. The current may then pass through the respective sets of inductor elements 81 and conductor segments 72 in series and finally through conductor segment 71 and straight conductor portion 70 to the other lug 72.

In order to prevent overheating of the apparatus during the operation thereof, suitable cooling means may be provided for the inductor I. Such cooling means may comprise an inlet pipe 91, Fig. 2, connected to a passage or bore 92 which extends through the straight conductor portion 65, circular conductor portion 66, and segmental conductor portion 67. From the latter, the passage 92 continues through the adjacent conductor member 84, conductor 85, conductor member 82 and then through the adjacent conductor segment 72. In similar manner, the passage 92 continues generally in a clockwise direction, Fig. 2, through the respective sets of inductor elements 81, and conductor segments 72 in series. The passage 92 extends into the conductor segment 71 from the adjacent inductor element 81, continues through said conductor segment 71 and then through the straight conductor portion 70 to a suitable outlet as at 93. Accordingly, a continuous stream of cooling fluid may be passed through the various conductor and inductor elements.

According to the invention, a suitable guide G, Figs. 1 and 3, is provided for directing the surfaces to be heated through the respective inductor elements 81. The guide G may comprise upper and lower sections 97 supported in any suitable manner, for example, by the table 22 and the top portion 26 of container 25, respectively. Suitable plates 98 are secured, respectively, to the upper and lower sections 97, the plates 98 having any suitable number of notches or slots 99 therein in which the blades B are guided. In the example shown, three slots or notches 99 are provided for guiding three of the blades B, respectively. The slots 99 in the respective upper and lower plates 98 are angularly offset with respect to the inductor elements 81 in accordance with the uniform angle of inclination or pitch of the lawn mower blades B. Consequently, when the blades are in the respective slots 99 of either the upper or lower section 97, the blade surfaces adjacent the inductor I are disposed between the conductor members 82, 84 of the respective inductor elements 81.

The operation is as follows:

The shaft 33 is elevated by operating the motor 42 until the fixture 43 is approximately at the same level as the insulating member 78, Fig. 1. The lawn mower blade assembly 46 or other object to be heated is placed upon the fixture 43 with the lower end of the shaft 47 extending into and engaging the pivot in the recess 45. The blade assembly 46 is rotated, if necessary, so that three of the blades B are disposed in the respective slots 99 in the upper guide plate 98. Thereupon, the shaft 50 is lowered into position so that the pivot in the recess 48 engages the upper end of the shaft 47. The springs 56, 56 urge the shaft 47 downwardly so that the blade assembly 46 is securely held between the fixtures 43, 49 with the shaft 47 in vertical alignment with the shafts 33, 50.

High frequency current is then passed through the inductor I by the previously-described circuit, this current inducing an intense localized electromagnetic field in the regions or heating zones within the inductor elements 81.

It will be noted that the conductor portion 66, in conjunction with the segments 72, comprise, in effect, a double loop formation extending from one of the terminals around to a point of reversal at 68 and then extending back around in closely spaced relation to the same formation, as another loop returning to the other terminal, the gaps as at 74 being provided at spaced points around one of the loops and the depending inductor portions as at 81 being connected respectively to bridge such gaps. In view of the close spacing of these two loop formations and the terminals therefor, only a small amount of inductance occurs therebetween, and accordingly substantial amounts of high frequency power may be readily supplied at each of the gaps where the inductors 81 are connected, and also because of such conductor arrangement, approximately the same amount of high frequency current may be made to flow through each of the depending inductors 81. This double loop conductor and supporting arrangement for the inductor portions 81 also has another important advantage. That is, if there were but a single loop formation made up of the segments 72, for example, there would be a high frequency field maintained throughout a substantial portion of the area enclosed thereby, and such a field would, of course, cause considerable undesired heating of the supporting frame structure or spider members of the work assembly, as well as its central shaft. Thus, a considerable part, at least, of the whole assembly would be hardened upon quenching following the heating, whereas ordinarily it will be desired to only harden the blade edge portions. In the structure as shown, for example, in Fig. 2, however, the provision of the outer return loop 66 causes such magnetic flux as occurs along the segments 72 to be largely concentrated between the segments and the return loop 66, so that there will be substantially no high frequency field in the central areas where the work assembly is to pass, except for the relatively intense localized fields within the channel-like paths formed by the inductor portions 81 and through which the blade edges are to pass.

Whenever current is flowing through the inductor, water or other cooling fluid is passed from the inlet 91, Fig. 2, through the described passage 92 and then to the outlet 93 whereby overheating of the inductor is prevented.

The motor 42 is then operated to move the shaft 33 downwardly, Fig. 1. As the blade assembly 46 moves downwardly, it rotates upon the pivots in the respective fixtures 43 and 49 in response to the guiding action on the blades B by the upper plate 98. The blades are thus guided through the respective heating zones established by the inductor elements 81 and thence into the quenching fluid contained in reservoir 25. Accordingly, each portion of the blade is heated to the desired tempering or hardening temperature during its passage through the heating zone and then quenched. As vertical motion of the lawn mower blade assembly toward the dotted line position of Fig. 1 continues, the upper portions of the blades B pass through and below the slots 99 in the upper guide plate 98. Prior to this time, some of the blades B have passed into the respective slots 99 in the lower guide plate 98 with the result that upper portions of the blades B are accurately and positively guided through the respective heating zones. Accordingly, the blade surfaces adjacent the inductor I are at all times, guided through the respective heating zones by either the upper or lower guide plate 98.

After the blade assembly has reached the dotted line position of Fig. 1, the current flowing through the inductor I is cut off. Thereupon the motor 42 is reversed and the shaft 33 elevated until the fixture 43 is approximately at the level of the insulating member 78. The upper shaft 50 may then be raised and the blade assembly 46 removed.

In this manner, all the blades B are rapidly and concurrently heating to a suitable tempering or hardening temperature and then immediately quenched by entering the cooling fluid within the container 25. It will be further appreciated that the heating effect is substantially localized and confined to the blades B due to the novel construction of the inductor I. Accordingly, no energy is wasted in heating the shaft 47 or the blade supporting spider portions of the assembly 46. Heating of such portions of the lawn mower blade assembly would, as above indicated, cause undesirable hardening, which could not be avoided, for example, if the entire blade assembly were inserted into a furnace for heat treatment or into the types of induction heating coils heretofore used.

In Figs. 7 to 13, inclusive, we have shown an alternative form of inductor which may comprise a copper bar or conductor 100, Fig. 7, extending from an attaching lug 62. Conductor 100 may comprise a straight portion 101 and a substantially continuous circular portion 102, Fig. 10, the return end of which is separated from the straight portion 101 as by an air gap 103, Fig. 11. Conductor 100 further comprises a downwardly-extending portion 104 which may be brazed or otherwise suitably secured to the circular portion 102 as at 105, Fig. 11.

A plurality of arcuate conductor segments 107, Figs. 7 and 9, are disposed in end to end relation beneath the circular conductor portion 102 and form a circular structure having substantially the same diameter as said circular conductor portion 102. One of the conductor segments 107 is disposed close to the downwardly-extending conductor portion 104 and is separated therefrom by an air gap 108 as is best shown in the inverted plan view, Fig. 8. The conductor segment 107 last named and the adjacent conductor segment 107 are separated by an air gap 109 and the same holds true with respect to each of the other sets of adjacent conductor segments 107. In the form of the invention shown although not necessarily, there are four of the conductor segments 107 and, in a counter-clockwise direction, Fig. 8, from the conductor portion 104, the last conductor segment 107 of the series is separated by an air gap 110 from an arcuate conductor segment 111 which is integral with a conductor block 112, the conductor segment 111 being separated from the conductor portion 104 by an air gap 103', Figs. 8 and 11. A substantially straight copper bar or conductor portion 114 is attached to the block 112 as at 115, Fig. 10, and the conductor portion 114 extends in generally parallel spaced relation to the aforesaid conductor portion 101 and is connected to one of the lugs 62.

As shown in Figs. 7 and 8, a plurality of insulating brackets 116 are suitably secured as by screws 117 to the circular conductor portion 102 on the one hand and the hereinbefore described conductor segments 107, 111 on the other hand. As a result, the described parts are held in assembled relation in such manner that the conductor segments are spaced from the conductor portion 102 by an air gap having such small width that the inductive effect there is small when the inductor is energized as hereinafter described. In connection with the foregoing, it will be noted that the bracket 116 which is secured to the conductor segment 111 maintains the hereinbefore described integral block 112 thereof in proper spaced relation with respect to the conductor portions 101 and 104.

An inductor structure 118, Figs. 8 and 13, is connected between downwardly-extending conductor portion 104 and the adjacent conductor segment 107 at and across the air gap 108. The inductor structure 118 is formed preferably from a single piece of copper tubing coated with insulating enamel if desired, and connected at its respective ends to the conductor portion 104 and the conductor segment 107. The copper tubing is shaped to from a suitable number, for example, three progressively smaller inductor elements or turns, each of which comprises a pair of parallel conductor members 119 properly connected at their ends to form a continuous path for electrical current.

An inductor structure such as at 118 is connected to adjacent conductor segments 107 at each of the air gaps 109. In similar fashion, an inductor structure 118 is connected between the conductor segment 111 and the adjacent conductor segment 107 at the air gap 110. It will be apparent, upon inspection of Fig. 13, that the conductor members 119 of each inductor structure 118 define a heating zone U of substantially U-shaped cross section, and extending longitudinally of the path of the blade B. Moreover, the heating zone U has the same angle of inclination with respect to the vertical as the lawn mower blades B, the construction of the inductor structures 118 allowing the respective lawn mower blades B to pass longitudinally through the heating zone U without contacting any part of the inductor structures 118.

Cooling means may be provided for the inductor comprising an inlet pipe 131 connected to a passage 132, Fig. 10, which extends through the straight conductor portion 101, circular conductor portion 102, downwardly-extending conductor portion 104, and thence through the adjacent inductor structure 118 to the adjacent conductor segment 107. The passage 132 then extends through the respective sets of inductor structures 118 and conductor segments 107 to conductor segment 111. From conductor segment 111, the passage 132 extends through conductor block 112 and straight conductor portion 114 to an outlet 133.

It will be understood that the lugs 62, 62 are adapted to be mounted on the secondary terminals 61 of transformer 60, Fig. 1. When so mounted, high frequency current from the transformer 60 may be passed through one of the lugs 62, straight conductor portion 101, circular conductor portion 102, downwardly-extending conductor portion 104, through the adjacent inductor structure 118 to the adjacent conductor segment 107. The current, then, passes through the respective sets of inductor structures 118 and conductor segments 107, through conductor segment 111, conductor plate 112, and conductor 114 to the other lug 62. This current induces an intense localized high frequency field in the heating zones U established by the respective inductor structures 118 whereas there is very little inductance between the remaining circuit portions because of their very close spacing from return circuit portions. The intense electromagnetic field induced in the heating zones U readily heats surfaces of an object passing therethrough, for example, to a desired tempering or hardening temperature. It will be understood that this alternative form of inductor may be substituted for the inductor I, Fig. 1, the apparatus shown in Fig. 1 being operated in the manner hereinbefore described to impart the desired temper or hardness to the lawn mower blades or other surfaces to be heated.

While the invention has been described with respect to present preferred embodiments which have given satisfactory results, and certain modifications have been referred to, it will be understood by those skilled in the art, after understanding the invention, that various other changes and modifications may be made without departing from the spirit and scope of the invention and it is intended, therefore, in the appended claims to cover all such changes and modifications.

What is claimed as new and desired to be secured by Letters Patent is:

1. Induction heating apparatus for heating work having the general form of helical blades as mounted on a rotor assembly, said apparatus comprising a conductor having the respective end portions thereof adapted for connection to two closely spaced terminals of a source of high frequency current, said conductor being constructed and arranged to form a loop portion extending from one terminal around in a loop formation back to a point near such terminal and there joining another loop portion which is closely spaced with respect to said first-named loop portion and extends back around in a like loop formation to the other terminal, a plurality of gaps being formed at spaced points along said conductor, and an elongated loop-like inductor portion physically connected to bridge each such gap and extending angularly with respect to the general plane of said conductor loops, a support and guide means for such rotor-blade assemblies and the like, and means to advance said support axially of the assemblies while the latter are gradually rotated by said guide means to an extent corresponding to the pitch of the helical blade formation, each elongated loop-like inductor including portions shaped and positioned to form a channel-like path containing a localized high frequency field through which the blade formation passes while being thus advanced.

2. Induction heating apparatus comprising a conductor having its ends adapted for connection to the terminals of a source of high frequency current, said conductor being constructed and arranged to extend from one terminal around in a loop formation and then reversing and extending back around in closely spaced relation to the same formation to the other terminal, said conductor having a plurality of gaps respectively at points spaced around such formation, and a loop-like inductor portion physically connected to bridge each such gap and extending transversely with respect to the general plane of such conductor loops, a support for the work to be heated and means for advancing said support in a direction generally axially of said conductor loops, each of said inductors including spaced opposed conductor portions extending generally along the path of travel of an element of the work and connected to maintain a localized high frequency field therealong for heating a strip along the work while the work is being thus advanced.

3. Induction heating apparatus for heating the blade portions of lawn mower blade assemblies and the like, comprising a conductor having its ends adapted for connection to the terminals of a source of high frequency current, said conductor being constructed and arranged to extend from one terminal around in a loop formation and then reversing and extending back around in closely spaced relation to the same formation to the other terminal, said conductor having a plurality of gaps respectively at points spaced around such formation, and a loop-like inductor portion physically connected to bridge each such gap and extending transversely with respect to the general plane of said conductor loops, a support for the blade assembly or the like and means for advancing said support in a direction generally axially of said conductor loops, while gradually rotating the assembly, each of said inductors including spaced opposed conductor portions extending along the path of travel of a blade and connected to maintain a localized high frequency field therealong for heating each blade while being thus advanced.

4. Induction heating apparatus for heating a series of work portions at positions spaced around a central area where substantial heating is to be avoided, said apparatus comprising a succession of rigid conductor pieces each extending from a point adjacent one of said positions to a point adjacent the next position, there being provided at each of said points respectively narrow gaps between the ends of said pieces, lengths of metal tubing connected respectively to bridge each of said gaps and to form an inductive turn or turns at each of the work positions and supported adjacent each gap, other rigid conductor portions extending in generally parallel spaced position along said rigid conductor pieces, said portions and pieces being physically connected to provide a current path from one terminal of a source of high frequency to extend in series through said succession of pieces and the intervening tube lengths and back in a reverse path through said portions to the other terminal of the source of high frequency current, the outgoing and reverse paths being closely spaced to avoid substantial inductance therebetween, whereby substantially the same amount of high frequency current flows through each tube length, and said conductor portions and pieces each having a cavity formed along within the same and communicating with the cavities within said tube lengths to proivde a similar series path for the flow of cooling fluid from one terminal back to the other.

WALLACE C. RUDD.
ROBERT J. STANTON.

REFERENCES CITED

The following references are of record in the file of this patent:

UNITED STATES PATENTS

| Number | Name | Date |
|---|---|---|
| 1,687,656 | Brown | Oct. 16, 1928 |
| 1,900,842 | Northrup | Mar. 7, 1933 |
| 2,052,010 | Bailey | Aug. 25, 1936 |
| 2,288,035 | Somes | June 30, 1942 |
| 2,348,361 | Rudd et al. | May 9, 1944 |
| 2,374,515 | Walton et al. | Apr. 24, 1945 |
| 2,385,904 | Witty | Oct. 2, 1945 |

FOREIGN PATENTS

| Number | Country | Date |
|---|---|---|
| 557,763 | Great Britain | Dec. 3, 1943 |